United States Patent
Wo et al.

(10) Patent No.: US 10,690,543 B1
(45) Date of Patent: Jun. 23, 2020

(54) SYSTEM, METHOD AND DEVICE FOR EVALUATING THE INTENSITY PROFILE OF A LASER BEAM

(71) Applicant: DHPC Technologies, Inc., Woodbridge, NJ (US)

(72) Inventors: Yei Wo, East Brunswick, NJ (US); Bruce P. Boczar, Trevose, PA (US); Joseph M. Aletta, Jackson, NJ (US)

(73) Assignee: DHPC Technologies, Inc., Woodbridge, NJ (US)

( * ) Notice: Subject to any disclaimer, the term of this patent is extended or adjusted under 35 U.S.C. 154(b) by 0 days.

(21) Appl. No.: 16/377,113

(22) Filed: Apr. 5, 2019

Related U.S. Application Data (60) Provisional application No. 62/685,117, filed on Jun. 14, 2018.

(51) Int. Cl.
  *G01J 1/02* (2006.01)
  *G01J 1/42* (2006.01)
  *G01J 1/04* (2006.01)

(52) U.S. Cl.
  CPC ........... *G01J 1/4257* (2013.01); *G01J 1/0271* (2013.01); *G01J 1/0407* (2013.01); *G01J 2001/0481* (2013.01)

(58) Field of Classification Search
  CPC ........... G01N 21/8806; G01N 21/9501; G01N 2203/0278; G01N 2203/0282; G01N 3/10; G01N 21/95684; G01N 2021/8663; G01N 2021/8812; G01N 21/59; G01N 21/9515; G01N 2201/0636; G01N 2201/0638; G01N 21/6456; G01N 21/6486; G01N 2201/062; G01N 2201/06113; G01N 21/53; G01N 15/06; G01N 15/1459; G01N 2015/0693; G01N 15/1434; G01N 15/147; G01N 1/2813; G01N 2001/282; G01N 2001/284; G01N 2015/1006; G01N 2015/144; G01N 2015/1447; G01N 2015/145; G01N 21/51;

(Continued)

(56) References Cited

U.S. PATENT DOCUMENTS 3,508,056 A  4/1970 Fricke
3,738,168 A  6/1973 Mansell
(Continued)

FOREIGN PATENT DOCUMENTS

CN  104655111 A  1/2017

*Primary Examiner* — Michael P Stafira
(74) *Attorney, Agent, or Firm* — LaMorte & Associates, P.C.

(57) ABSTRACT

A system, method, and device for evaluating the intensity profile of a laser beam. The laser detection system has a target surface with an interior and an exterior. The target surface and a housing create a target pod with an enclosed interior chamber. A beacon is provided at the target pod to provide for targeting. A camera is provided that images the interior of the target surface from within the enclosed interior chamber. Some percentage of the intensity of the laser beam passes through the target surface uniformly and illuminates the interior of the target surface when the laser beam strikes the target surface. The illumination of and subsequent scattering from the interior of the target surface is imaged by the camera for analysis. By detecting the laser intensity as a function of position, the intensity profile of the laser beam can be quantified.

15 Claims, 6 Drawing Sheets

(58) Field of Classification Search
CPC .......... G01N 21/6428; G01N 21/718; G01N 2201/0221; G01N 29/2418; G01N 15/0211; G01N 19/04; G01N 1/38; G01N 2001/002; G01N 2015/1493; G01N 2015/1497; G01N 2021/392; G01N 2021/6419; G01N 2021/6465; G01N 2021/6471; G01N 2021/6478; G01N 2021/845; G01N 2021/8908; G01N 2021/95676; G01N 21/01; G01N 21/0303; G01N 21/0332; G01N 21/1702; G01N 21/39; G01N 21/645; G01N 21/6458; G01N 21/648; G01N 21/8422; G01N 21/85; G01N 21/94; G01N 21/95; G01N 2201/061; G01N 2201/068; G01N 2201/08; G01N 2201/105; G01N 2201/12; G01N 2223/611; G01N 2291/0231; G01N 23/22; G01N 23/223; G01N 23/2251; G01N 27/745; G01N 29/043; G01N 29/265; G01N 29/34; G01N 29/4445; G01N 33/53; G01N 33/58; G01J 2001/0481; G01J 3/0272; G01J 3/0291; G01J 1/0411; G01J 1/0425; G01J 1/0437; G01J 1/4257; G01J 3/0202; G01J 3/0205; G01J 3/0208; G01J 3/0264; G01J 3/06; G01J 3/18; G01J 3/28; G01J 3/443; G01J 3/502; G01J 3/505; G01J 5/522; G01J 5/60; G02B 17/04; G02B 19/0023; G02B 19/0028; G02B 19/0047; G02B 23/10; G02B 23/243; G02B 23/2469; G02B 23/26; G02B 26/0891; G02B 26/108; G02B 6/0035; G02B 6/006; G02B 6/0095; G02B 23/22; G02B 27/283; G02B 6/0006; G02B 6/4298; G02B 27/0927; G02B 3/0087; G02B 27/0025; G02B 3/0081; G02B 3/12; G02B 3/14; G02B 7/023; G02B 27/0916; G02B 19/0057; G02B 21/002; G02B 21/06; G02B 21/16; G02B 27/0961; G02B 27/4272; G02B 5/3083; G02B 6/0008; G02B 6/4206; G02B 17/06; G02B 17/061; G02B 19/0009; G02B 19/0052; G02B 2006/12176; G02B 21/025; G02B 21/08; G02B 23/06; G02B 23/08; G02B 23/12; G02B 25/001; G02B 26/04; G02B 26/06; G02B 26/0808; G02B 26/0816; G02B 26/101; G02B 26/105; G02B 27/0068; G02B 27/0093; G02B 27/09; G02B 27/0905; G02B 27/0938; G02B 27/0966; G02B 27/0994; G02B 27/10; G02B 27/1086; G02B 27/12; G02B 27/14; G02B 27/141; G02B 27/142; G02B 27/146; G02B 27/40; G02B 27/425; G02B 27/48; G02B 3/005; G02B 5/0268; G02B 5/04; G02B 5/10; G02B 5/1814; G02B 5/1823; G02B 5/1838; G02B 5/1861; G02B 6/0061; G02B 6/0288; G02B 6/04; G02B 6/1221; G02B 6/262; G02B 6/2804; G02B 6/2821; G02B 6/2826; G02B 6/2856; G02B 6/32; G02B 6/34; G02B 6/368; G02B 6/3885; G02B 6/3895; G02B 6/42; G02B 6/4204; G02B 6/4212; G02B 6/4219; G02B 6/4221; G02B 6/4225; G02B 6/4226; G02B 6/4227; G02B 6/4249; G02B 6/4266; G02B 6/4291; G02B 6/4296; G01B 11/2509; G01B 11/002; G01B 11/25; G01B 11/00; G01B 11/14; G01B 11/24; G01B 11/2408; G01B 11/2513; G01B 11/2518

See application file for complete search history.

(56) References Cited

U.S. PATENT DOCUMENTS

| | | | |
|---|---|---|---|
| 3,939,706 A | 2/1976 | Pinson | |
| 4,037,470 A | 7/1977 | Mock et al. | |
| 4,175,748 A | 11/1979 | Yokoi | |
| 4,321,824 A | 3/1982 | Martin | |
| 4,440,506 A | 4/1984 | Eitel | |
| 4,797,555 A | 1/1989 | LaMar | |
| 5,227,859 A * | 7/1993 | Leib | F41G 7/224 250/226 |
| 5,638,208 A | 6/1997 | Walker | |
| 5,850,225 A | 12/1998 | Cosman | |
| 6,176,584 B1 | 1/2001 | Best et al. | |
| 8,441,625 B2 | 5/2013 | Wick, Jr. | |
| 8,988,674 B2 | 3/2015 | Anikitchev et al. | |
| 9,134,174 B2 * | 9/2015 | Jungwirth | G01S 7/495 |
| 2008/0206720 A1 | 8/2008 | Nelson | |
| 2010/0240015 A1 | 9/2010 | Chung et al. | |
| 2012/0183931 A1 | 7/2012 | Galanis et al. | |
| 2013/0308183 A1 | 11/2013 | Vermeirsch et al. | |
| 2014/0231576 A1 * | 8/2014 | Rinker | F41G 7/008 244/3.16 |
| 2017/0328986 A1 * | 11/2017 | Chankaya | G01S 19/13 |

* cited by examiner

SYSTEM, METHOD AND DEVICE FOR EVALUATING THE INTENSITY PROFILE OF A LASER BEAM

RELATED APPLICATIONS

This application claims the benefit of U.S. Provisional Patent Application No. 62/685,117, filed Jun. 14, 2018.

BACKGROUND OF THE INVENTION

1. Field of the Invention

In general, the present invention relates to systems that are used to detect and evaluate the intensity profile of a laser beam by providing data on the spatial, temporal, and spectral characteristics of the laser at a target site. Additionally, the present invention relates to systems that are used to detect and evaluate the intensity of laser beams in non-laboratory environments such as within garages, hangars, and outdoor test ranges.

2. Prior Art Description

In the modern military, lasers are used in many applications. Examples of these applications are optical communications, laser target designators, and laser countermeasure systems. In order for these applications to be successful the laser beam being utilized must have a specific spatial intensity profile, a specific temporal profile and an appropriate wavelength. The intensity and temporal profile, and laser wavelength can be different for varied applications of laser systems.

The present invention primarily relates to laser defense systems. In the prior art, laser defense systems are typically field tested by directing the laser at a prepared target. The prepared target is typically placed in an open location, such as a field. The prepared target is then targeted at a distance by the laser defense system in a vehicle or aircraft. The prepared target has detectors that can detect when a laser illuminates the target and can provide information regarding the intensity of the laser beam that strikes the prepared target. As an alternative to this direct detection method, the laser beam intensity profile can also be measured by using a remote camera and viewing the image of the laser beam spot reflected from the prepared target.

The problem for the prior art during field testing is the lack of fidelity in the prepared target and the incomplete data that is typically obtained using the prepared target. The intensity profile of a laser beam can fluctuate widely from point to point in an area of exposure. As such, some areas of exposure experience different intensities. In the traditional direct detection method, the limited number of discrete detectors limits the spatial resolution of the resultant data across the beam diameter. In the traditional reflected image detection method, the image spatial resolution of the resultant data becomes a trade-off of the various camera system parameters, such as field of regard, instantaneous field of view, camera distance to the target, and the like.

In a controlled environment, such as a laboratory, laser beam characteristics can be measured by focusing the laser on a calibrated detector. Such detection methods are practical to use in a laboratory but are highly impractical to take into the field because the geometrical growth of the beam at longer distances. Additionally, laboratory testing does not characterize beam distortions due to variations in the atmosphere experienced by the beam in the field. Complex detectors of this type are exemplified by U.S. Pat. No. 8,441,625 to Wick.

When a prepared target is being used in the field, the target must be made large enough to intercept the full beam width of a laser emanating from an aircraft or vehicle that is hundreds of meters away. However, when a target is made large, it becomes far more susceptible to environmental factors, such as wind. In the prior art, prepared targets are often made by painting a large flat panel with a special paint. The paint is designed to provide a well characterized reflectivity (e.g. Lambertian) for the incident laser beam. The laser beam intensity profile is then determined by using a remote camera and viewing the image of the laser beam spot reflected from the prepared/painted target. Such prior art panels are exemplified by U.S. Pat. No. 4,797,555 to La Mar, entitled High Energy Laser Target Plate.

Painted panels provide some data regarding laser beam intensities, but the data collected is inherently imprecise. Every panel is slightly different from every other panel. Every batch of paint is slightly different from every other batch of paint. The thickness of the paint applied to the panel varies from panel to panel. Furthermore, the panels move and flutter in the wind. Movement of the panels changes the angle of incidence between the incoming laser beam and the panel. Even slight changes in the angle of incidence can have great impact upon the measured intensity of the laser beam.

Another example of the prior art attempts typically utilize a series of small sensors that are disposed across a target area that have large open spaces between the sensors. Such prior art is exemplified by U.S. Pat. No. 4,321,824, to Martin. The obvious problem associated with such prior art systems is that there is no detection of signal occurring in the open areas between sensors. Thus, large areas of the impinging laser beam are not detected and an accurate profile for intensity cannot be generated.

A need therefore exists for a prepared target that can accurately measure the intensity and profiles of a laser beam across a large target area, without large expense, and without having results affected by wind and other environmental factors. At the same time, it is also desirable to measure the temporal profile of the incident laser to ensure that the correct modulation, or lack of, is being provided to accomplish the desired result. Spectral data of the beam will quantify the effectiveness of the system under test. These needs are met by the present invention as described and claimed below.

SUMMARY OF THE INVENTION

The present invention is a laser detection and evaluation system for use in field testing a laser beam. The laser detection system has a target surface with an interior and an exterior. The target surface is supported by a housing. The target surface and the housing create a target pod with an enclosed interior chamber.

A camera is used to image the interior of the target surface from within the enclosed interior chamber. This images results in an intensity distribution as a function of position. The camera has a field of view that captures the extent of the interior of the target surface. The target material is chosen such that a portion of the laser beam intensity across the entire beam passes through the target surface and illuminates the interior of the target surface when the laser beam strikes the target surface. The illumination of the interior of the target surface is imaged by the camera for analysis. By detecting areas of varied illumination, the intensity profile of the laser beam can be quantified.

The system may also include a beacon to help the target surface be located and targeted by the laser system being evaluated.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention laser detection system and method can be used to test, calibrate and otherwise develop a variety of specialty lasers. Although the present invention laser detection system can be configured in different ways to test different laser systems, only two exemplary embodiments are herein illustrated and described. These embodiments are selected in order to set forth two of the best modes contemplated for the invention. The illustrated embodiments, however, are merely exemplary and should not be considered limitations when interpreting the scope of the appended claims.

Figure 1:
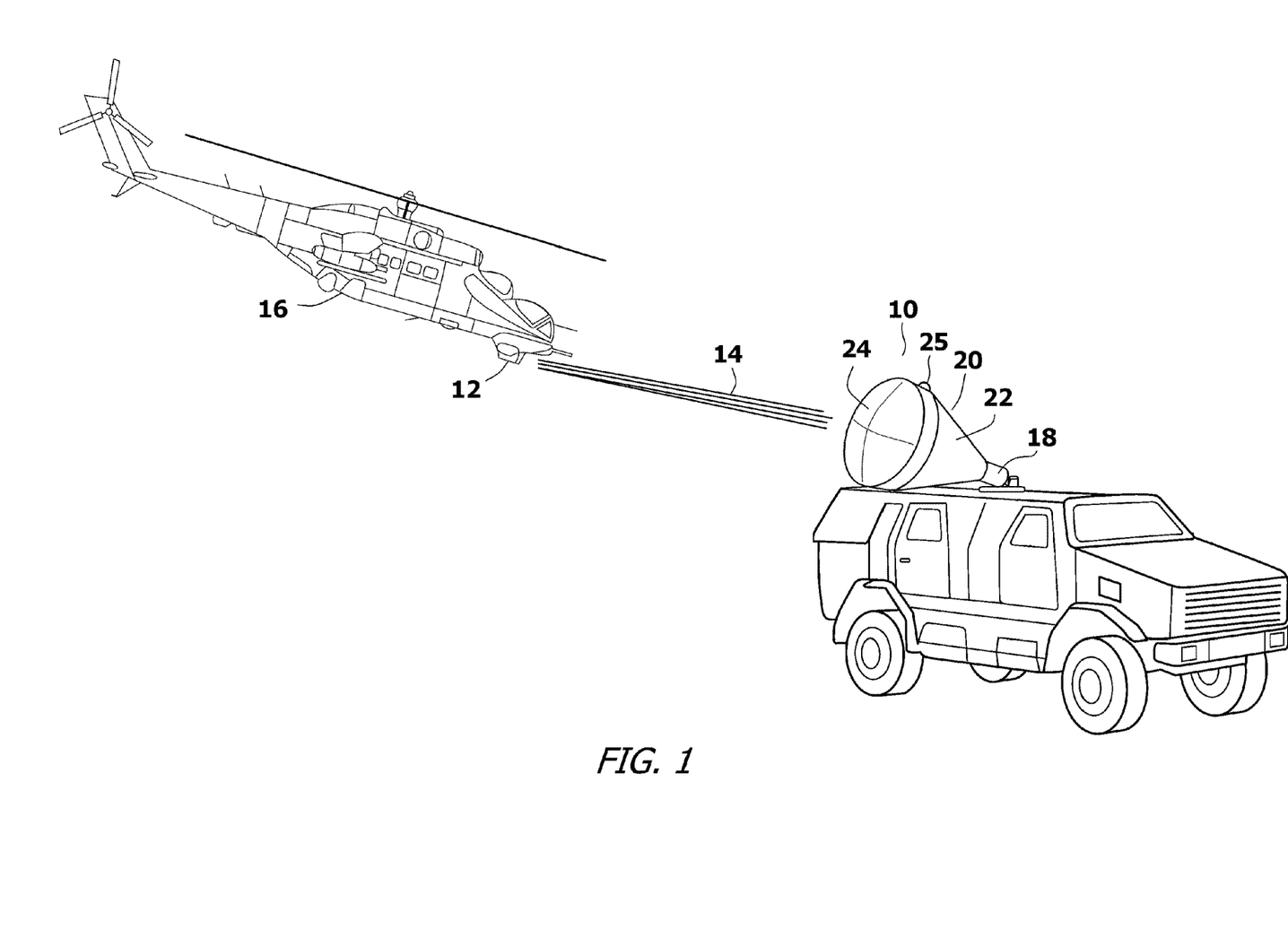
FIG. 1 is a schematic showing the overall system of use that includes an exemplary embodiment of the present invention laser detection system.
Figure 2:
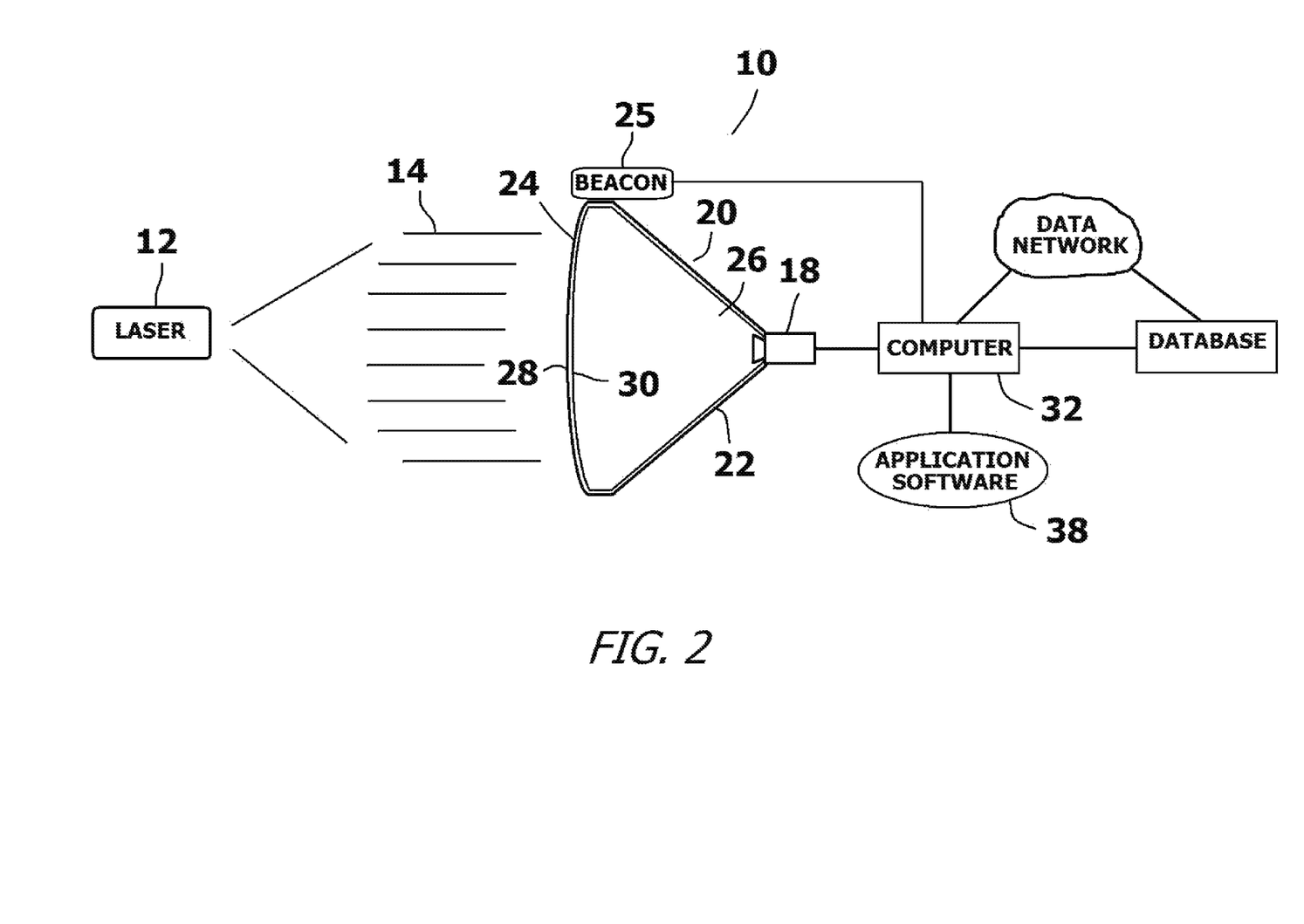
FIG. 2 is a cross-section of the target pod used in the exemplary laser detection system of FIG. 1.

Referring to FIG. 1 in conjunction with FIG. 2, a laser detection system 10 is shown. The laser detection system 10 is used to detect and analyze a laser system 12. The laser system 12 can be used for many purposes, such as communications, target designation, or countermeasures. The laser system 12 generates a laser beam 14. The laser system 12 is typically mounted on a vehicle, boat or aircraft. In the shown embodiment, the laser system 12 is mounted to a helicopter 16.

The laser detection system 10 includes a large target pod 20 that can be seen by the optical targeting systems of the helicopter 16. A location beacon 25 can be provided either as part of the target pod 20 or as a unit proximate the target pod 20. The beacon 25 is used to locate and target the target pod 20 with the laser system 12 from the helicopter or other weapon platform.

The target pod 20 is an assembly that includes a camera 18, a conical housing 22 and a curved dome 24. The curved dome 24 can be hemispherical or a portion of a hemisphere, wherein the curvature of the curved dome 24 provides some structural integrity. The curved dome 24 is the widest part of the target pod 20, wherein it is the exterior of the curved dome 24 receives part of the laser beam 14 of the laser system 12.

The curved dome 24 is supported by the conical housing 22. The conical housing 22 is rigid and may contain ribbing or other structural elements that cause it to keep its shape during handling and during bad weather. The assembly of the curved dome 24 and its supporting conical housing 22 define an internal analysis chamber 26. The camera 18 is located at the narrow end of the conical housing 22, wherein the camera 18 images the interior of the curved dome 24 from within the internal analysis chamber 26.

The assembly of the curved dome 24 and the conical housing 22 is rigid and waterproof. As such, the analysis chamber 26 is shielded and remains unaffected by winds, rain, humidity, air pressure and other changing environmental factors. As will be further explained, the laser beam 14 from the laser system 12 is aimed at an exterior surface 28 of the curved dome 24. A portion of the laser energy passes through the material of the curved dome 24 and illuminates the interior surface 30 of the curved dome 24 inside the analysis chamber 26. The illumination of the interior surface 30 is analyzed by the camera 18 within the protection of the analysis chamber 26. The camera 18 is connected to a computer system 32 that analyses the data from the camera 18 and calculates an intensity profile for the laser beam 14 for the period of time that the laser beam 14 illuminates the curved dome 24.

As shown in FIG. 2, the interior surface 30 of the curved dome 24 and the camera 18 are selected, sized and positioned so that the field of view of the camera 18 covers the entire interior surface 30 of the curved dome 24. The curved dome 24 itself is made from a thin wall of plastic, smoked glass or colored glass that is translucent to ambient light but nearly transparent to the frequencies or wavelength of the laser beam 14. Accordingly, the material of the curved dome 24 itself acts as a filter that separates some ambient light from the impinging light of the laser beam 14. This helps reduce the background light. The conical housing 22 that supports the curved dome 24 is preferably opaque to the wavelengths of interest. Accordingly, all internal illumination of the analysis chamber 26 comes from light passing through the curved dome 24.

The interior surface 30 is illuminated by the light of the laser beam 14 passing there through. The camera 18 is an imaging camera or an imaging array that can detect the wavelength of light contained in the laser beam 14. The field of view of the camera 18 covers the interior surface 30 of the curved dome 24. As such, the output of the camera 18 corresponds directly to what is observable on the interior surface 30 of the curved dome 24. Areas on the interior surface 30 that are brighter and darker can readily be detected by the camera 18, within the sensitivity range of the camera 18.

Figure 3:
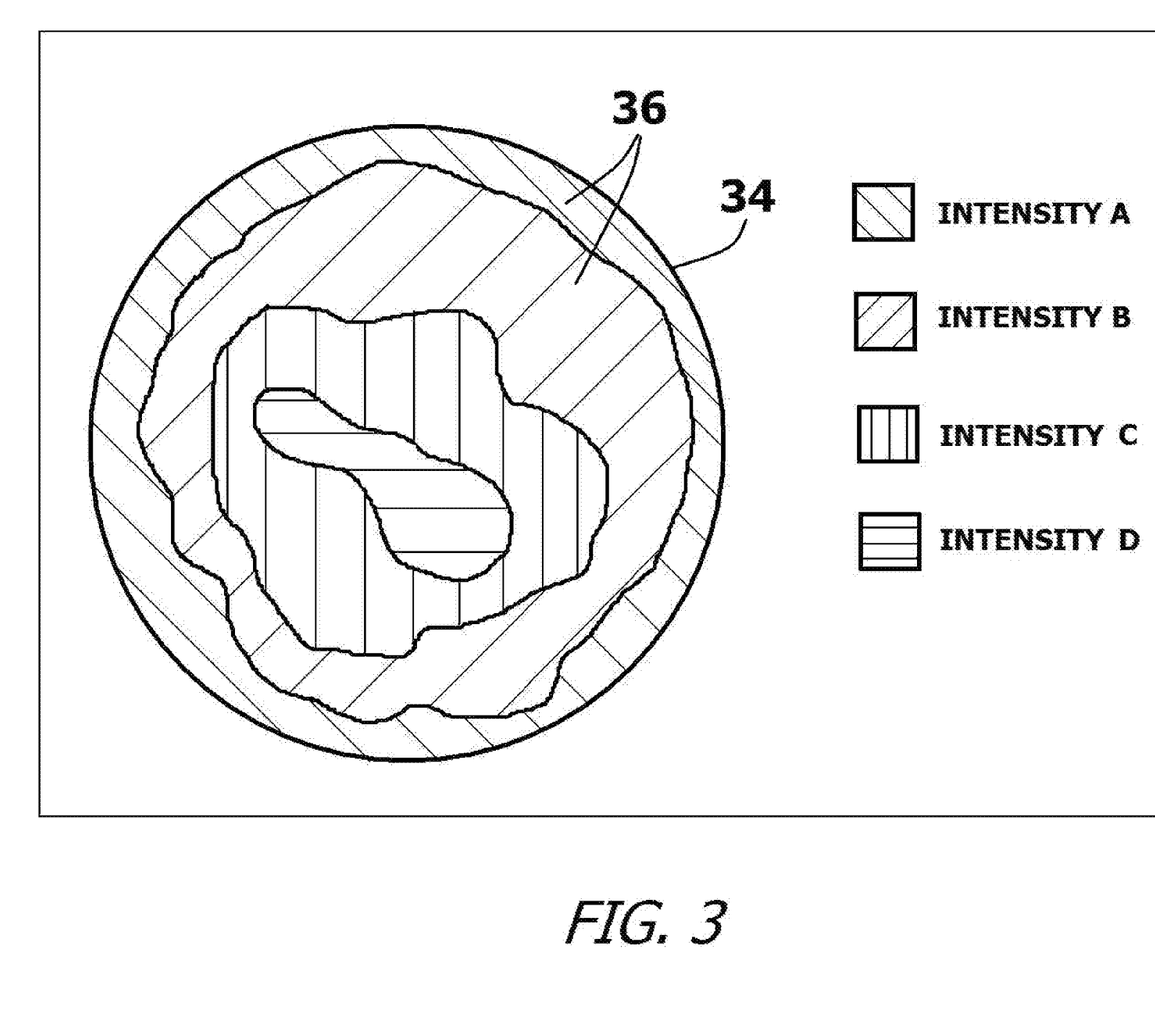
FIG. 3 is a data display created by the laser detection system.

The output of the camera 18 is analyzed by application software 38 being run by the computer system 32. Referring to FIG. 3 in conjunction with FIG. 2, one format for the analyzed data of the camera 18 is shown. FIG. 3 shows one exemplary output of the computer system 32 that is prepared using the application software 38. The area of the graph corresponds to the field of view 34 of the camera 18, which corresponds to the area of the interior surface 30 of the curved dome 24. As can be seen, there are generally concentric areas 36 of increasing and decreasing light intensity. The size of these areas 36 is what is of interest to researchers. Likewise, any anomalies in symmetry are likewise highly useful in research. Although FIG. 3 illustrates an example output for analyzing light intensity, it will also be understood that similar outputs can be generated for analyzing variations in intensity across the field of view 34. Numerous output formats for the camera data can be created depending upon the aspects of the application software 38 being utilized.

Figure 4:
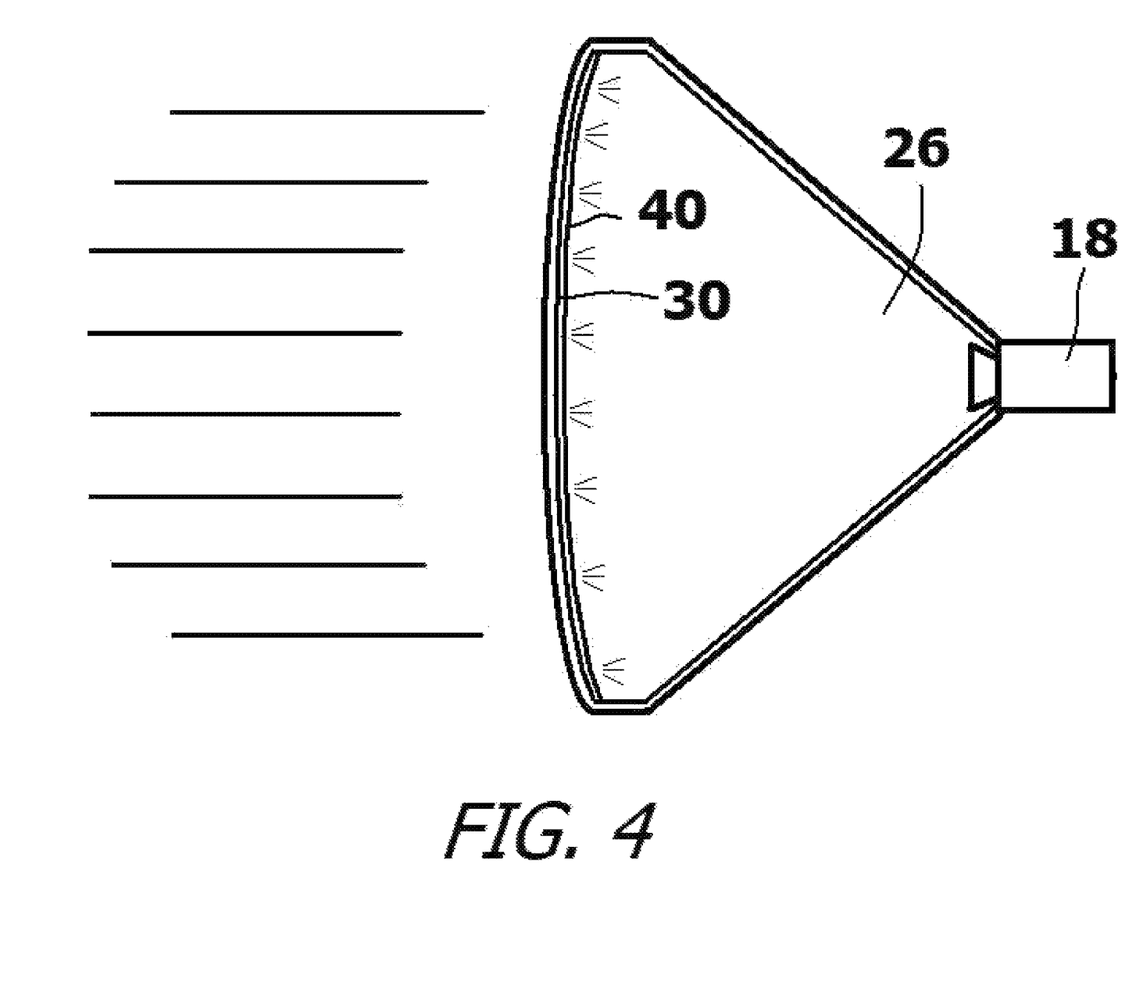
FIG. 4 is a cross-section of an alternate embodiment of the target pod.

Referring to FIG. 4, the outer surface 28 and inner surface 30 will attenuate the impinging laser beam uniformly across the dimension of the dome 24 so that the scattered light from scattering centers 40 will be an accurate representation of the intensity of the impinging laser beam at each location.

Figure 5:
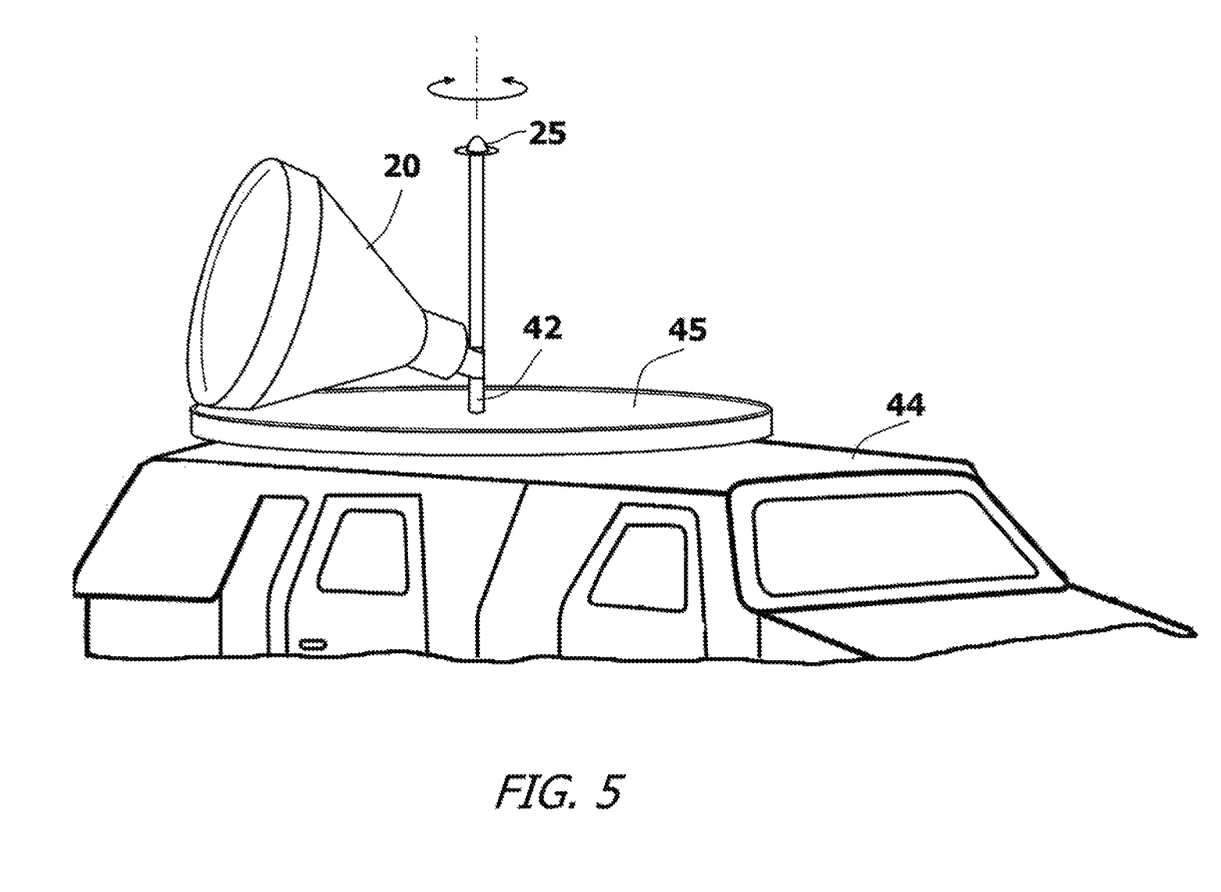
FIG. 5 shows a laser detection system mounted atop a support vehicle.

Referring to FIG. 5, it can be seen that one or more of the target pods 20 can be mounted to a support truck 44 or a trailer. A single beacon 25 is used for targeting. The generally conical shape of the target pods 20 enables the target pods 20 to roll in a circular path 45. In this manner, one or more target pods 20 can be attached to a direction shaft 42. The direction shaft 42 can be used to adjust the orientation of the target pod 20 without having to change the position of the support truck 44. The image captured by the camera 18 can be have a roll angle index so that images from different approaches can be properly compared. In this manner, a helicopter, vehicle or boat can approach the support truck 44 from different angles and the target pod 20 can be oriented to obtain useful test results. Also, the ability to change the orientation of the target pod 20 enables the target pod 20 to be oriented away from the sun. In this manner, the signal noise caused by sunlight can be greatly reduced.

Figure 6:
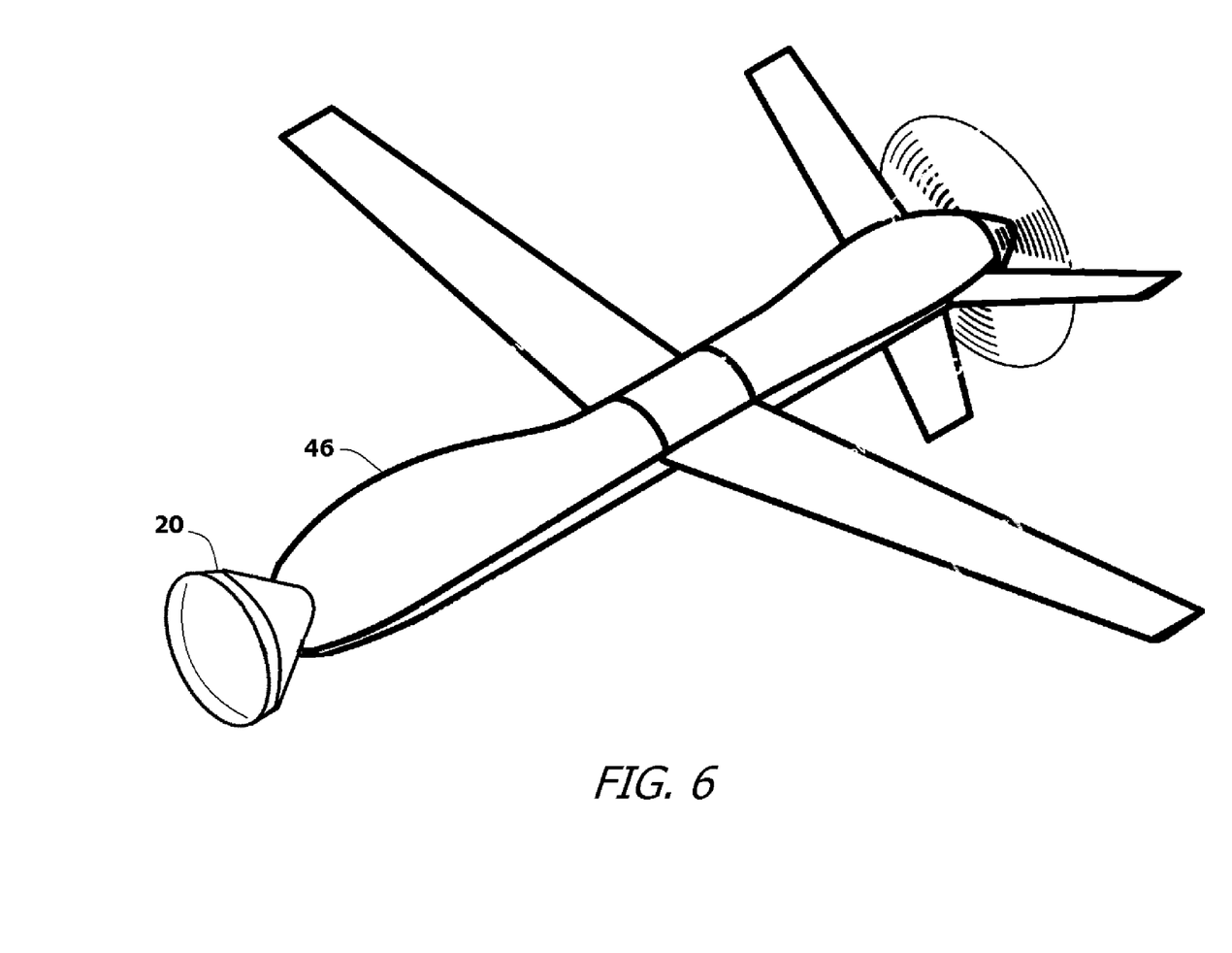
FIG. 6 shows a laser detection system mounted to a drone aircraft.

Since the target pods 20 are wind and weather resistant, they can be mounted to a vehicle, boat or aircraft and still function properly. Referring to FIG. 6, a detection pod 20 is shown attached to a test drone 46. As the test drone 46 flies, it can mimic an enemy plane or missile. The lasers of a defensive system can then be tested, wherein the results of the test would be more realistic than tests taken from a stationary point on the ground.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A system for evaluating the intensity profile of a laser beam, said system comprising:
    a target pod that is targeted by said laser beam, said target pod having a conical housing with wide end and a narrow end, wherein said wide end of said conical housing is covered by a dome that has an interior surface and an exterior surface,
    wherein said dome and said conical housing define an enclosed chamber, wherein said interior surface of said dome faces said enclosed chamber; and
    a camera positioned at said narrow end of said conical housing that images said interior surface of said dome from within said enclosed chamber, wherein at least some of said laser beam passes through said dome from said exterior surface to said interior surface when said laser beam shines upon said exterior surface of said dome, therein illuminating said interior surface of said dome for imaging by said camera.

2. The system according to claim 1, further including a beacon.

3. The system according to claim 1, wherein said camera has a field of view that covers said interior surface of said dome.

4. The system according to claim 1, wherein said exterior surface of said dome is convex and said interior surface of said dome is concave.

5. The system according to claim 1, wherein said conical housing is opaque to wavelengths contained within said laser beam.

6. The system according to claim 1, wherein said laser beam has an intensity profile with areas of different intensity, wherein said laser beam illuminates said interior surface of said dome in a manner that corresponds to said intensity profile.

7. The system according to claim 6, further including a computer that is coupled to said camera and identifies said intensity profile of said laser beam from imagery of said interior surface of said dome captured by said camera.

8. The system according to claim 1, further including a mechanism for orienting said target pod in different directions.

9. A system for evaluating the intensity profile of a laser beam, said system comprising:
    a target pod having a conical housing with a wide end and a narrow end, wherein said conical housing is opaque to said laser beam;
    a target surface covering said wide end of said conical housing, wherein said target surface has an interior that faces into said conical housing to form an enclosed chamber; and
    a camera that images said interior of said target surface from within said enclosed chamber, wherein at least some of said laser beam passes through said target surface when said laser beam shines upon said target surface, therein illuminating said interior of said target surface for imaging by said camera.

10. The system according to claim 9, wherein said target surface is curved and said interior of said target surface is concave as viewed by the camera.

11. The system according to claim 10, wherein said camera has a field of view that covers said interior of said target surface.

12. The system according to claim 9, wherein said laser beam has an intensity profile with areas of different intensity, wherein said laser beam illuminates said interior of said target surface in a manner that corresponds to said intensity profile.

13. The system according to claim 12, further including a computer that is coupled to said camera and identifies said intensity profile of said laser beam from imagery of said interior of said target surface captured by said camera.

14. The system according to claim 9, further including a shaft coupled to said target pod, wherein said target pod can move about said shaft to selectively orient said target surface in different directions.

15. The system according to claim 14, further including a beacon.

* * * * *